(12) United States Patent
Springer et al.

(10) Patent No.: US 6,404,871 B1
(45) Date of Patent: Jun. 11, 2002

(54) TERMINATION NUMBER SCREENING

(75) Inventors: Arthur L. Springer, Waterloo, IA (US); Dean Marchand, Brighton, CO (US)

(73) Assignee: MCI WorldCom, Inc., Jackson, MS (US)

( * ) Notice: Subject to any disclaimer, the term of this patent is extended or adjusted under 35 U.S.C. 154(b) by 0 days.

(21) Appl. No.: 09/464,135

(22) Filed: Dec. 16, 1999

(51) Int. Cl.[7] .......................... H04M 1/66; H04M 11/00; H04M 17/00

(52) U.S. Cl. ..................... 379/189; 379/91.02; 379/144; 379/145; 379/196

(58) Field of Search ............................. 379/188, 189, 379/190, 191, 192, 193, 194, 195, 196, 197, 198, 199, 200, 144, 145, 91.01, 91.02, 93.02

(56) References Cited

U.S. PATENT DOCUMENTS

| | | | |
|---|---|---|---|
| 5,345,595 A | * 9/1994 | Johnson et al. | 379/189 X |
| 5,463,681 A | * 10/1995 | Vaios et al. | 379/189 |
| 5,566,234 A | * 10/1996 | Reed et al. | 379/188 |
| 5,602,906 A | 2/1997 | Phelps | 379/114.14 |
| 5,638,431 A | 6/1997 | Everett et al. | 379/114.28 |
| 5,768,354 A | 6/1998 | Lange et al. | 379/189 |
| 5,805,686 A | 9/1998 | Moller et al. | 379/198 |
| 5,809,125 A | 9/1998 | Gammino | 379/189 |
| 5,867,566 A | 2/1999 | Hogan et al. | 379/115.01 |
| 5,875,236 A | 2/1999 | Jankowitz et al. | 379/114.24 |
| 5,907,602 A | 5/1999 | Peel et al. | 379/114.14 |
| 5,970,405 A | 10/1999 | Kaplan et al. | 455/410 |
| 5,988,497 A | 11/1999 | Wallace | 235/382.5 |
| 6,163,604 A | 12/2000 | Baulier et al. | 379/189 |

* cited by examiner

Primary Examiner—Harry S. Hong

(57) ABSTRACT

Terminating number screening to block portable billing products from terminating to a designated high fraud domestic or international terminating numbers. When a call is placed and it is billed to a portable billing product, the dialed digits of the terminating number is verified against the terminating number screening database. If the sequence of dialed digits is found in the terminating number screening database, the call is denied. The caller is then informed that they cannot place a call to this destination and asked if there is another terminating number they wish to call. If the sequence of dialed digits is not found in the terminating number screening database, the call is allowed to process without interruption. The purpose of this functionality is to protect the Operator Service network from repeated fraudulent calling to individual telephone line numbers either international or domestic. The unique characteristic of this function is the ability to select a single terminating number for blocking, based on product type, such as a calling card, Credit card, and other billing options.

20 Claims, 2 Drawing Sheets

TERMINATION NUMBER SCREENING

TECHNICAL FIELD OF THE INVENTION

The present invention relates in general to telecommunications, and more particularly to a terminating number screening process used to block selected numbers from future calls on a operator platform.

BACKGROUND OF THE INVENTION

Recent studies in the telecommunication industry has estimated call fraud losses cost communication companies five billion dollars per year. This industry study also shows that the fraud losses will continue to increase in the future. The telecommunication fraud losses primarily occur as a result of lost or stolen portable calling card products and Operator Service products in highly populated areas. Portable calling card products generally refer to any Operator Service billed products including calling card, credit cards, collect calls, calls that are billed to a third party, and calls that are billed to automatic identification numbers (ANI).

Telecommunication fraud can be committed in various ways. One example of such fraud includes call looping. Call looping is a method which the perpetrators or hackers use to circumvent restrictions that telecommunication carriers put into the networks to control portable billing products. This call looping fraud may be committed, for example, through a residential automatic number identification (ANI) which has been call forwarded to a compromised Private Branch Exchange (PBX) equipment.

Looping may also be used by perpetrators to hide or avoid detection of their origination number. Call looping enables the perpetrator to generate several different call legs while masking his true point of origination. The perpetrator's purpose for call looping is to obtain a calling card product or the use of other billing options through operator service providers in order to terminate calls to high fraud phone numbers. High fraud phone numbers generally refer to phone numbers that have repeated occurrences of fraud. These high fraud phone numbers can be domestic or international numbers. These terminating numbers, i.e., the destination dialed digits that the caller is trying to call, may include chat and party lines in which callers use long distance devices.

Looping may be committed by several avenues, such as a company private branch exchange (PBX) equipment or telephones that are call forwarded to an access number. Briefly, an access number is defined as a number that takes a caller to a carrier platform or network. Example of an access number include "1-800", "1-888" calling card access numbers, "10-10-222", or "10-10-321" dial around codes. Call looping perpetrators may loop calls through one carrier, or they may loop them through multiple carriers. Looping takes many forms and may use many different billing products. The end result is to by-pass the blocks and to make it difficult to identify the origination point.

The following scenario describes an example of call looping. A perpetrator, physically located in New York, dials a local access number by using a stolen calling card. The stolen calling card is issued by a long distance carrier and, therefore, belongs to the long distance carrier. Furthermore, the long distance carrier has placed blocks in the New York area to control international termination dialing. Because the perpetrator cannot dial the international number, the perpetrator connects to a domestic termination number belonging to a business in Iowa that is equipped with PBX. The perpetrator is now able to dial "9" for an outside line from the Iowa Business, and "00" for the long distance operator. Once at the operator, the perpetrator is able to call an international number and bill it to the number that they are originating from. In this case, the PBX in Iowa. The perpetrator is able to call an international number because the long distance carrier has fewer blocks on the originating location of Iowa for international destinations.

In the foregoing example, by utilizing multiple legs, i.e., New York to Iowa using the stolen calling card, and Iowa to an international site using the PBX, the perpetrator successfully bypassed the long distance carrier's network blocks and created two individual billing records that are not linked together, thus masking the true originating point.

Another example of a call looping is consummated by using multiple carriers. A perpetrator, physically located in Netherlands, dials an in-country international access number using a stolen calling card. The stolen calling card belongs to a first long distance carrier who has placed blocks on the Netherlands locations to control international or domestic termination locations. The perpetrator inputs a terminating number that is another access number for a second long distance carrier. By using two carrier networks to effect an international call, the perpetrator has successfully bypassed the network blocks placed in service by the first carrier. The true destination cannot be determined by the first carrier because the second leg, i.e., second carrier's access number to the termination number, only appears as the second carrier's call information.

Given various ways through which a fraud can occur in the existing telecommunications network systems, it is highly desirable to provide a method and system for screening call termination numbers before a call is made to any existing destination or terminating numbers, regardless of the path or paths taken to make the call.

An existing method utilized by many carriers typically block fraudulent calls based on a stolen billing product, for example, a calling card number. Thus, with this existing method, calls made with specific calling card numbers known to the carriers as stolen products are blocked. However, since a fraud perpetrator may have hundreds of stolen billing products at disposal, the perpetrator can eventually find a billing product that is not blocked to place a call to high fraud phone numbers.

Therefore, it is also highly desirable to be able to block fraudulent calls regardless of billing products with which a call is made.

SUMMARY OF THE INVENTION

Accordingly, the present invention provides a method and system to block select number from any future calls on the operator platform, thereby preventing fraudulent calls to specific terminating numbers residing in international or domestic locations.

The present invention also provides the ability to deny call completions based upon a blocked domestic or international number and enables service providers to control fraudulent usage while minimizing the impact on other existing customers.

In accordance with the goals of the present invention, there is provided a method and system for terminating number screening which is designed to block portable billing products from terminating to a designated high fraud domestic or international terminating number. When a call is placed and it is billed to a portable billing product, the sequence of the dialed digits of the terminating number is verified against the terminating number screening database.

If the sequence of dialed digits is found in the terminating number screening database, the call is denied. Denying calls to the selected terminating numbers effectively prevents fraudulent calls reoccurring at the same terminating number.

The terminating numbers stored in the screening database of the present invention are generally collected by conducting research, pattern matching, fraud trends, or other analysis based on calls made to a specific number to determine if that specific number is a high fraud phone number. From such research and analysis, if a specific number is determined to be a high fraud phone number, that number is stored in the database as a number to be blocked.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENT OF THE INVENTION

Figure 1:
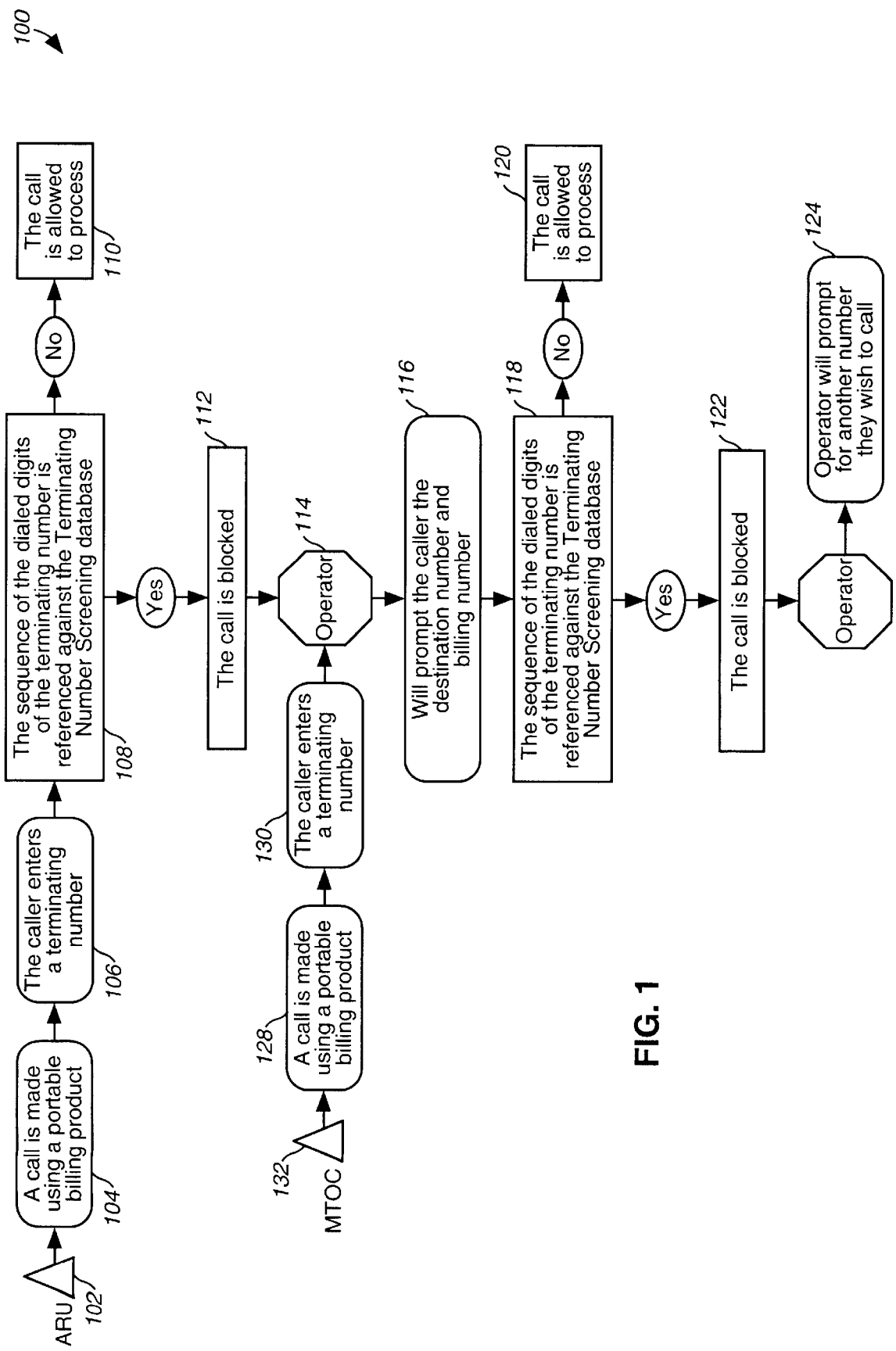
FIG. 1 is a flow diagram illustrating the termination screening process of the present invention.

Terminating number screening is a process of blocking portable billing products from terminating to a specific high fraud domestic or international number. High fraud phone numbers generally refer to phone numbers that have repeated occurrences of fraud. FIG. 1 is a flow diagram illustrating the termination screening process 100 of the present invention. The termination screening of the present invention may be performed by an automated response unit (ARU) 102, or by a manual transfer operator console (MTOC) 132.

At step 104, when a caller dials an access method to place a call, the caller is prompted to enter a portable billing number. An access method is defined as an avenue which takes a caller to a carrier platform or network. Examples of access methods includes utilizing "1-800" and "1-888" call card access numbers, and "10-10-222", "10-10-321" dialing around codes. At step 106, after the portable billing number is entered, the caller enters a desired terminating number. At step 108, the input sequence of the dialed digits of the terminating number is used to reference a terminating number screening database to determine whether the call should proceed.

At step 110, if the sequence of the dialed digits is not found within the terminating number screening database, the call is allowed to continue. On the other hand, at step 112, if the sequence of the dialed digits is found within the terminating number screening database, the call is denied.

At step 114, when the call is denied at step 112 because the terminating number matched one of the numbers in the terminating number screening database, the caller is routed to an operator, who prompts for a billing number and desired destination terminating number at step 116. The sequence of the dialed digits of the terminating number is then referenced against the terminating number screening database at step 118. At step 120, if the sequence of the dialed digits is not found within the terminating number screening database, the call is allowed to progress. If the sequence of the dialed digits is found within the terminating number screening database, the call is denied at step 122. At step 124, the operator then prompts the caller for another terminating number a caller desires to dial.

At step 128, when the caller desires to place a call directly with an operator, the caller enters a terminating number as shown at step 130. The operator at step 116, them prompts for a billing number and a desired destination terminating number. The sequence of the dialed digits of the terminating number is then compared with entries in the terminating number screening database. If the sequence of the dialed digits is not found within the terminating number screening database, the call is allowed to process. If the sequence of the dialed digits is found within the terminating number screening database, the call is denied. The operator then prompts the caller for another terminating number to call.

In a preferred embodiment, the dialed digits must match exactly with the restricted terminating number stored in the terminating number screening database for blocking the call.

Figure 2:
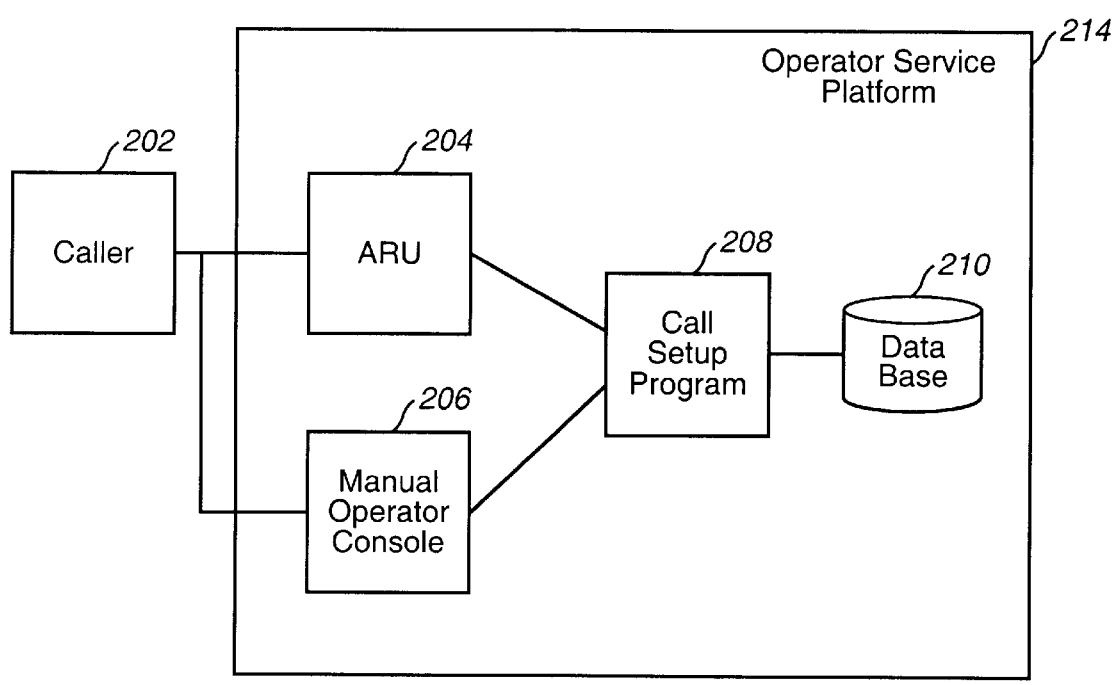
FIG. 2 illustrates the components of the system of the present invention for blocking call terminations.

FIG. 2 illustrates the components of the system of the present invention for blocking call terminations. When a caller 202 places a call using one of the known access methods, the caller 202 is connected to an automated response unit (ARU) 204 or a manual operator 206 on a operator service platform 214 as shown. The caller 202 then must enter an access number. The access number is received either by the ARU 204 or the manual transfer operator console 206. Upon receipt of the access number, an automated code logic, typically integrated with the call setup program 208, is invoked.

This code logic is responsible for looking up the terminating number screening database 210 to determine if the dialed destination number associated with the billing product type is stored in the terminating number screening database 210. If a match is found, that is, an entry having the billing product type associated with the dialed destination number is found in the terminating number screening database 210, an error code is populated on the operator console 206 indicating that the called number cannot be processed. If the call was made through the ARU 204, an automated recording may be played back to the caller, indicating the same. The caller is then prompted for another number to call as described with reference to FIG. 1.

The terminating number screening database 210 may be any commercially known database. The database 210 includes terminating numbers that are identified based upon current fraud trends and analyst detections. The terminating numbers stored in the screening database 210 are generally collected by conducting research, pattern matching, fraud trends, and other analysis based on calls made to a specific number to determine if that specific number is a high fraud phone number. To use the aforementioned example, if there is a trend of calls being made at 10:00 PM with a portable calling product to a business enterprise XYZ having business hours from 9:00 AM to 5:00 PM, e.g., an Iowa business implementing a PBX, and these 10:00 PM calls are further being directed or rerouted to another destination number that is not related to the business, then XYZ's phone number is included in the terminating number screening database 210 as a high fraud phone number. Thus, from research and analysis, if a specific number is determined to be a high fraud phone number, that number is stored in the database designated as a number to be blocked. Subsequent calls made to the number are blocked because the number exists in the terminating number screening database 210.

Terminating number screening of the present invention is unique because it may be used to block the terminating number based upon a portable billing product. For instance, in the above given example, if a detected trend indicates that fraudulent calls were made to the XYZ phone number with a specific portable billing product, e.g., an MCIWorldCom calling card product, any call made to that number using the MCIWorldCom calling card product may be blocked. Such a blocking method prevents reoccurrence of the fraudulent use of XYZ's phone number. Thus, regardless of how many unique portable billing product numbers, e.g., unique calling card numbers, are used to make a call to a specific phone number, if that specific phone number exists in the terminating number screening database 210, any calls made to this number using the portable billing product, e.g., any calling cards, are blocked.

Moreover, terminating number screening of the present invention may also block numbers based on all portable billing products. That is, using the above example, not only those calls made with calling cards are blocked, but calls made using any other portable billing products such as collect calls, credit cards, etc., also may be blocked.

The data in the database 210 is populated or entered in real-time upon immediate detection of a trend or a pattern. Thus, the terminating number screening database 210 may be continuously updated with new fraudulent terminating numbers as the new numbers are discovered. Consequently, any terminating numbers, including any intermediary numbers used for call looping, if the intermediary numbers exist as entries in the terminating number screening database, may be blocked. The database 210 is typically indexed via a terminating number, i.e., a phone number to where a call is placed.

Furthermore, the call setup program 208 and the database 210 need not be located local to the operator platform. That is, it is possible to have a remotely located database 210 and the call setup program 208 via connections such as the wide area network (WAN), Internet, as well as a local area network (LAN) connection to an enterprise's intranet.

While the invention has been particularly shown and described with respect to a preferred embodiment thereof, it will be understood by those skilled in the art that the foregoing and other changes in form and details may be made therein without departing from the spirit and scope of the invention.

What is claimed is:

1. A method for preventing call looping wherein a caller utilizes a portable billing product to access a domestic or international terminating number determined as being subject to repeated occurrences of fraud, the method comprising:

determining that a portable billing product is being used to enable access to a terminating number;

automatically intercepting dialed digits of the terminating number for placing a call;

comparing the dialed digits with numbers stored in a terminating number screening database comprising high fraud terminating numbers; and preventing the call from being placed to the terminating number if the dialed digits match any one of the numbers stored in the terminating number screening database when a portable billing product is being used to enable access to the terminating number.

2. The method for terminating number screening as claimed in claim 1, further including the step of associating one or more portable billing product types used for accessing said terminating number subject to said fraud, said step-preventing step further including:

determining a portable billing product used to enable access to said terminating number; and preventing the call to the terminating number if the call is charged to an associated portable billing product.

3. The method for terminating number screening as claimed in claim 2, wherein said determining step further includes:

receiving an identification number associated with a portable billing product to which to charge the call for identifying said portable billing product type; and the step of comparing includes, comparing the dialed digits with numbers stored in a terminating number screening database, the numbers associated with the type of the portable billing product.

4. The method for terminating number screening as claimed in claim 1, the method further including:

automatically transferring the call to an operator if the dialed digits exist in the terminating number screening database.

5. The method for terminating number screening as claimed in claim 1, the method further including:

prompting for a second terminating number if the call to the terminating number was prevented.

6. The method for terminating number screening as claimed in claim 3, the method further including:

prompting for a second terminating number and a second billing product identification number if the call to the terminating number was prevented.

7. The method for terminating number screening as claimed in claim 1, the method further including:

dynamically updating the terminating number screening database with newly discovered fraudulent terminating numbers.

8. The method for terminating number screening as claimed in claim 1, the method further including:

dynamically updating the terminating number screening database based on a pattern recognition of past calls made to a selected terminating number.

9. The method for terminating number screening as claimed in claim 1, wherein the step of intercepting is performed via an automated response unit.

10. The method for terminating number screening as claimed in claim 1, wherein the step of intercepting is performed via a manual transfer operator console.

11. A program storage device readable by machine, tangibly embodying a program of instructions executable by the machine to perform method steps for preventing a portable billing product to access a domestic or international terminating number determined as subject to repeated occurrences of fraud, the method steps comprising:

determining that a portable billing product is being used to enable access to a terminating number;

automatically intercepting dialed digits of the terminating number;

comparing the dialed digits with numbers stored in a terminating number screening database comprising high fraud terminating numbers; and preventing the call to the terminating number from being placed if the dialed digits match any one of the numbers stored in the terminating number screening database when a portable billing product is being used to enable access to the terminating number.

12. The program storage device as claimed in claim 11, further including the step of associating one or more portable billing product types used for accessing said terminating number subject to said fraud, said step-preventing step further including:

determining a portable billing product used to enable access to said terminating number; and preventing the call to the terminating number if the call is charged to an associated portable billing product.

13. The program storage device as claimed in claim 12, wherein said determining step steps further includes:

receiving an identification number associated with a portable billing product to which to charge the call for identifying said portable billing product type; and the step of comparing includes, comparing the dialed digits with numbers stored in a terminating number screening database, the numbers associated with the type of the portable billing product.

14. The program storage device as claimed in claim 11, wherein the method steps further include:

automatically transferring the call to an operator if the call to the terminating number was prevented.

15. The program storage device as claimed in claim 11, wherein the method steps further include:

dynamically updating the terminating number screening database with newly discovered fraudulent terminating numbers.

16. The program storage device as claimed in claim 11, wherein the method steps further include:

dynamically updating the terminating number screening database based on a trend analysis of past calls made to a selected terminating number.

17. A system for terminating number screening to block portable billing products from terminating to designated high fraud domestic or international terminating numbers, the system comprising:

a response unit for automatically intercepting dialed digits of the terminating number when a portable billing product is being used by a caller to access a domestic or international terminating number;

a terminating number screening database having one or more fraudulent terminating numbers; and an automated code logic unit coupled to the response unit and the terminating number screening database, the automated code logic unit being programmed to access the terminating number screening database, compare the terminating number received from the caller with the one or more fraudulent terminating numbers stored in the terminating number screening database, and generate a signal to prevent a call to the terminating number if the terminating number matches anyone of the one or more fraudulent terminating number in the terminating number screening database when a portable billing product is being used by a caller to access a domestic or international terminating number.

18. The system for terminating number screening as claimed in claim 17, the system further including:

an automated response unit for receiving the terminating number from the caller, the automated response unit transferring the received terminating number to the automated code logic for comparison with the terminating number screening database.

19. The system for terminating number screening as claimed in claim 17, the system further including:

a manual transfer operator console for receiving the terminating number from the caller, the automated response unit transferring the received terminating number to the automated code logic for comparison with the terminating number screening database.

20. The system for terminating number screening as claimed in claim 18, wherein the terminating number screening database is located remotely from the automated response unit.

\* \* \* \* \*